(12) United States Patent
Duerr et al.

(10) Patent No.: US 12,448,022 B2
(45) Date of Patent: Oct. 21, 2025

(54) DISPLAY-AND-CONTROL SYSTEM OF A MOTOR VEHICLE

(71) Applicant: Dr. Ing. h.c. F. Porsche Aktiengesellschaft, Stuttgart (DE)

(72) Inventors: Florian Duerr, Stuttgart (DE); Chris Paulus, Calw-Stammheim (DE); Kersten Stahl, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 231 days.

(21) Appl. No.: 18/200,722

(22) Filed: May 23, 2023

(65) Prior Publication Data
US 2023/0373304 A1    Nov. 23, 2023

(30) Foreign Application Priority Data
May 23, 2022    (DE) ..................... 10 2022 112 871.7

(51) Int. Cl.
*B62D 1/04*    (2006.01)
*B60K 35/10*    (2024.01)
(Continued)

(52) U.S. Cl.
CPC .............. *B62D 1/046* (2013.01); *B60K 35/10* (2024.01); *B60K 35/215* (2024.01); *B60K 35/29* (2024.01); *B60K 35/60* (2024.01); *B60K 35/22* (2024.01); *B60K 35/81* (2024.01); *B60K 2360/11* (2024.01); *B60K 2360/782* (2024.01)

(58) Field of Classification Search
None
See application file for complete search history.

(56) References Cited

U.S. PATENT DOCUMENTS 9,073,568 B2    7/2015    Krauss et al.
9,417,448 B2    8/2016    Takasu et al.
(Continued)

FOREIGN PATENT DOCUMENTS

DE    102006035171    1/2008
DE    102007051017    3/2009
(Continued)

OTHER PUBLICATIONS

German Search Report dated Mar. 14, 2023.
British Office Action dated Nov. 28, 2023.

*Primary Examiner* — James J Lee
*Assistant Examiner* — Andrew Sang Kim
(74) *Attorney, Agent, or Firm* — Gerald E. Hespos; Michael J. Porco

(57) ABSTRACT

A display-and-control system (1) of a motor vehicle (2) has multiple display devices (3) and multiple control devices (5) arranged on a multi-function steering wheel (6) for driver interaction. The control devices (5) have multiple control elements arranged on the multi-function steering wheel (6). The display devices (3) include a central main display device (12) to display at least one main control parameter and at least one additional display device (13) that can be activated in at least one adjustment mode (14). The additional display device (13) can be arranged to the left and to the right of the main display device (12) and can display at least one additional control parameter (15) that can be adjusted by the driver.

9 Claims, 2 Drawing Sheets

(51) Int. Cl.
  *B60K 35/215* (2024.01)
  *B60K 35/22* (2024.01)
  *B60K 35/29* (2024.01)
  *B60K 35/60* (2024.01)
  *B60K 35/81* (2024.01)

(56) References Cited

U.S. PATENT DOCUMENTS

| | | | |
|---|---|---|---|
| 9,902,268 B2 | 2/2018 | Nojiri | |
| 2003/0023353 A1* | 1/2003 | Badarneh | B60K 35/658 |
| | | | 701/1 |
| 2012/0319828 A1* | 12/2012 | Krauss | B60Q 3/16 |
| | | | 340/425.5 |
| 2013/0166100 A1* | 6/2013 | Gordh | B60W 30/16 |
| | | | 701/1 |
| 2016/0075234 A1 | 3/2016 | Takamatsu et al. | |
| 2016/0291806 A1 | 10/2016 | Civiero et al. | |
| 2020/0218404 A1* | 7/2020 | Camhi | B60K 35/80 |

FOREIGN PATENT DOCUMENTS

| | | |
|---|---|---|
| DE | 102009049111 | 4/2011 |
| DE | 102013002036 | 8/2013 |
| DE | 102012020320 | 4/2014 |
| JP | 2008001120 | 1/2008 |
| WO | 2023166439 | 9/2023 |

* cited by examiner

DISPLAY-AND-CONTROL SYSTEM OF A MOTOR VEHICLE

CROSS REFERENCE TO RELATED APPLICATION

This application claims priority on German Patent Application No 10 2022 112 871.7 filed May 23, 2022, the entire disclosure of which is incorporated herein by reference.

BACKGROUND

Field of the Invention

The invention relates to a display-and-control system of a motor vehicle and to a motor vehicle with such a display-and-control system.

Related Art

A display-and-control system for a motor vehicle comprises multiple display devices including a central main display device for displaying main control parameters, such as velocity and/or rotational speed. A display-and-control system also comprises control devices with control elements that can be operated or actuated manually. Some control elements are arranged on a multi-function steering wheel for driver interaction, and some of these control elements are so-called satellite buttons. A "satellite button" is understood to mean a control element configured as a rotary and/or push actuator that is arranged laterally on the hub or laterally on a spoke of a steering wheel and thus in a satellite space. The satellite space is bounded radially on the inside by the hub, radially on the outside by the rim, and circumferentially between two spokes. Satellite buttons can be activated with the thumbs when the hands are gripping the rim.

U.S. Pat. No. 9,073,568 B2 discloses a display-and-control system with a multi-function steering wheel that has a rim, a hub, and spokes connecting the hub to the rim. A first satellite button is arranged in a right satellite space for selecting one of multiple driving modes, while three further satellite buttons are arranged in a left satellite space for direct access to defined vehicle functions. Each vehicle function can be turned on and off by actuating the respective satellite button.

DE 10 2012 020 320 A1 discloses a display-and-control system with a combination instrument that can be operated in different control modes. Exclusively non-selectable information is presented in two control modes, and exclusively selectable information is presented in a further control mode.

DE 10 2006 035 171 A1 discloses a display-and-control system in which the combination instrument changes from an information mode into a pop-up display mode by actuation of a steering wheel button, and various adjustments can be made by actuation of further steering wheel buttons.

DE 10 2013 002 036 A1 discloses a display-and-control system that enables various adjustments to be made in the combination instrument by conventional steering wheel buttons.

DE 10 2009 049 111 A1 discloses a display-and-control system with a multi-function steering wheel that has multiple control elements for turning on or off display regions of the combination instrument.

US 2016 0291806 A1 discloses a display-and-control system that has a multi-function steering wheel with multiple control elements for adjusting parameters displayed on the instrument panel.

An object of the invention is to provide a display-and-control system that with increased ease of use, simplified control access and suitability for sport driving operation.

SUMMARY OF THE INVENTION

The invention comprises display devices or a combination instrument with at least one additional lateral display device that is configured as interaction graphics. More particularly, the additional lateral display device can be activated and deactivated and can be seen by the driver only in the activated state. The interaction graphics are thus a demand-based display, i.e. a display that is activated only as needed and is only visible in the activated state. To this extent, the interactive graphics may be a pop-up display. The additional lateral display device can be activated in at least one adjustment mode and is arranged to the left or to the right of the main display device in the activated state. The additional display device functions to display at least one additional control parameter and can be adjusted by the driver. At least one of the control elements functions to adjust the additional control parameter of the activated additional display device. The additional display device thus represents interaction graphics for driver support that can be activated as needed. The function to be controlled, i.e. the adjustable additional control parameter, can vary depending on the adjustment mode and on the active display content.

In some embodiments, the manually controllable or actuatable control elements can be satellite buttons to facilitate their intuitive accessibility.

In one embodiment, the system is configured so that the additional control parameter shown in the additional display device depends on the adjustment mode so that different additional control parameters are displayed in the same activated additional display device during different adjustment modes. This creates an increased ease of use that requires comparatively little space within the combination instrument. The "configuration" of the system may relate to programming and/or design of the system.

The additional display device can be configured so that different additional control parameters can be adjusted in different adjustment modes with the same control element or the same satellite button. This embodiment simplifies handling with low space consumption in the combination instrument.

A multi-function steering wheel typically has a rim, a hub and spokes connecting the hub to the rim. Control elements that are configured as satellite buttons may be on the spokes inward of the rim and/or outward of the hub. Thus, these control elements are easily accessible and actuatable with thumbs, even when the driver is firmly gripping the rim. Simple control access is possible and provided without removing the hands from the steering wheel. This improves vehicle safety, in particular when driving in a sport manner, because the driver can adjust additional control parameters without abandoning secure grip of the multi-function steering wheel. The indications "inside" and "outside" refer to the axis of rotation about which the multi-function steering wheel can be rotated. Accordingly, "inside" means radially inward relative to this axis of rotation, while "outside" is radially outward. The indications "left" and "right" refer to the installation state of the display-and-control system in the vehicle and, in relation to the multi-function steering wheel, to a neutral position of the multi-function steering wheel associated with the straight-line travel of the vehicle.

In some embodiments, the arrangement of the satellite buttons on the multi-function steering wheel and in particular their association with the additional control parameters corresponds to the arrangement of the additional control parameters in the respective additional display device. As a result, a satellite button may correspond to an additional control parameter due to its arrangement, and this additional control parameter can be adjusted. The arrangement of the satellite buttons inside the multi-function steering wheel may be reflected in the display devices or in the combination instrument. For example, the main display device, e.g. a tachometer, may be at the center or hub of the multi-function steering wheel, and the additional display devices arranged laterally thereto represent the particular lateral arrangement of the satellite buttons on the multi-function steering wheel. This results in intuitive operability and increases operational safety.

In one embodiment a first satellite button serves to select a driving mode from multiple driving modes, and the respective additional display device can be activated and deactivated in a predetermined driving mode but cannot be activated in at least one other driving mode. Thus, the respective additional display device is not available in all adjustable driving modes, but only in at least one predetermined driving mode, so that the additional control parameters are also only adjustable then. This increases operational safety, because the driver must consciously first switch into the respective driving mode to be able to change these additional control parameters.

Some additional display devices can be activated only in a single specified driving mode, for example in a sport or racing mode. However, that additional display device cannot be activated in other driving modes, such as a comfort mode or a normal mode. If the driver activates a satellite button when the vehicle is not in the predetermined driving mode, the driver may be informed via the combination instrument that, the driver must first switch to the predetermined driving mode to be able to make adjustments.

In some embodiments, the additional display device is not automatically activated in the predetermined driving mode. Rather, an additional driver-side interaction may be required to activate the respective additional display device in the predetermined driving mode. In one embodiment, the respective additional display device is activated in the predetermined driving mode only by actuating a further satellite button that is different from a first satellite button. The selection of the predetermined driving mode pre-adjusts multiple control parameters that characterize the driving mode. A selection of these control parameters can be adjusted by the driver. To do so, the driver must activate the respective additional display device in the predetermined driving mode. This shows him or her the additional control parameters that he or she can now adjust.

The display-and-control system presented herein is coupled in an appropriate manner to a vehicle controller to be able to make the adjustments of the additional control parameters via the control devices, and to be able to present the additional control parameters in the display devices. Likewise, the control devices are coupled indirectly via the vehicle controller or also directly to the combination instrument to be able to activate and deactivate the additional display device. In the context of this disclosure, a "vehicle controller" can be understood to include, for example, a processor and/or a storage unit or memory for storing algorithms and program commands. By way of example, the vehicle controller is configured to carry out program commands in such a way that the processor and/or the control computer carries out functions described herein. The term vehicle controller is used here synonymously with devices known from the prior art and therefore, encompasses one or more general-purpose processors (CPUs) or microprocessors, RISC processors, GPUs and/or DSPs. The vehicle controller has, for example, additional elements such as storage interfaces or communication interfaces. Optionally or additionally, "vehicle controller" refers to a device that is capable of executing a provided or included program, preferably with standardized programming language (for example C++, JavaScript or Python), and/or of controlling and/or accessing data storage devices and/or other devices such as input interfaces and output interfaces. Vehicle controller also refers to a multiplicity of processors or a multiplicity of (sub)computers that are interconnected and/or connected and/or otherwise communicatively connected and possibly share one or more other resources, such as for example a memory According to one embodiment, the activatable additional display device can display at least two different additional control parameters that are individually adjustable by actuating at least two different satellite buttons. This enables a particularly simple adjustment of the additional control parameters, thereby increasing the operational safety. Simpler additional control parameters may be controlled with only one satellite button.

One of the at least two satellite buttons can be formed by the first satellite button. In other words, the first satellite button has at least two different functionalities. On the one hand, the respective driving mode can thus be selected. On the other hand, at least one additional control parameter can be adjusted when the respective additional display device is activated in the predetermined driving mode.

A satellite button of one embodiment is a combination button that can be actuated by pushing and rotating, and different control functions are associated respectively with pushing actuation and rotating actuation. For example, the push actuation can enable turning on or off or an activating and deactivating of a predetermined function, while a rotation enables an additional control parameter to be adjusted.

In one embodiment, one satellite button enables the selection of the driving mode by a push actuation, while enabling the adjustment of at least one additional control parameter by a rotating actuation when the respective additional display device is activated in the predetermined driving mode.

Another embodiment provides that a further satellite button enables the activation of the respective adjustment mode of the additional display device by a pushing actuation in the predetermined driving mode and enables the adjustment of at least one additional control parameter by a rotating actuation. Different additional satellite buttons enable different adjustment modes to be activated in the respective additional display device, so that different additional control parameters can be adjusted.

The display devices or the combination instrument may comprise two lateral additional display devices configured as interaction graphics, namely a left additional display device arranged to the left of the main display device in the activated state and a right additional display device arranged to the right of the main display device in the activated state. These two lateral additional display devices in the activated state function to display different additional control parameters. For example, a first satellite button may function to adjust the additional control parameter of the activated left additional display device, and a second satellite button may function to adjust the respective additional control parameter of the activated right additional display device. One of these two satellite buttons can be formed by the first satellite button. The association of a satellite button with an additional control parameter in the respective adjustment mode results in a simple handling and increased vehicle safety even in the sport mode.

In a further development the at least one satellite button associated with the left additional display device is arranged in the left satellite space, while the at least one satellite button associated with the right additional display device is arranged in the right satellite space. This measure simplifies the intuitive actuation of the satellite buttons for adjusting the additional control parameters.

One embodiment provides that the respective additional display device can be activated selectively in at least two different adjustment modes in which the respective additional display device can display different additional control parameters. Furthermore, at least three satellite buttons can be provided, namely the first satellite button, a second satellite button for activating the additional display device in a first adjustment. This second satellite button functions to activate both additional display devices in a first adjustment mode, a third satellite button functions to activate only the left additional display device in a second adjustment mode, and a fourth satellite button functions to activate only the right additional display device in a third adjustment mode. Thus, at least four satellite buttons are available. The first satellite button enables the selection of the respective driving mode. The further satellite buttons enable the selection of the respective adjustment mode, which is then carried out by activating the respective additional display device. In at least one adjustment mode, the respective non-activated additional display device can be shown passively, such that the additional control parameters associated with the respective non-activated passively shown additional display device are visible to the driver but are not adjustable via the satellite buttons in the moment.

A further embodiment has at least four satellite buttons. In particular, a second satellite button functions to activate both additional display devices in a first adjustment mode, in which an adjustable second additional control parameter and an adjustable third additional control parameter are displayed in the left additional display device, while an adjustable first additional control parameter and an adjustable fourth additional control parameter are displayed in the right additional display device. In this case, the first satellite button is arranged in the right satellite space and functions to adjust the first additional control parameter while the second satellite button is arranged in the left satellite space and functions to adjust the second additional control parameter. Further, a third satellite button can be arranged in the left satellite space to adjust the third additional control parameter, while a fourth satellite button can be arranged in the right satellite space to adjust the fourth additional control parameter. Thus, four different additional control parameters can be adjusted intuitively and easily by the driver.

A spring-damper system of the vehicle can be adjusted by the driver in the first adjustment mode. For example, the first satellite button can function to adjust the suspension of the front axle as the first additional control parameter, while the second satellite button can function to adjust the damping of the front axle as the second additional control parameter. The third satellite button can be used for damping on the rear axle as the third additional control parameter, while the fourth satellite button can adjust the suspension of the rear axle as the fourth additional control parameter. For example, as the second adjustment mode, two different additional control parameters of a torque vectoring system can be adjusted. In the third adjustment mode, additional control parameters of a traction control system as well as a stabilizing system, for example, can be adjusted. In particular, it is provided here that the traction control and/or vehicle stabilization can be deactivated independently from one another.

Another aspect of the invention relates to a motor vehicle, such as a passenger vehicle, that comprises a display-and-control system of the type described above and a vehicle controller coupled thereto. The motor vehicle can have an internal combustion engine, or at least one electric motor or a hybrid drive.

Further important features and advantages of the invention follow from the accompanying description of the figures in relation to the drawings.

The features mentioned above and those discussed below can be used in the respectively specified combination, in other combinations or on their own, without departing from the scope of the invention. The features described above and referred to below of a higher-level unit, e.g. a device, an apparatus, or an assembly, which are designated separately, can constitute separate components of this unit, or integral regions or sections of this unit, even if shown differently in the drawings.

Examples of the invention are set forth in the drawings and will be explained in further detail in the description below, wherein identical reference numbers refer to identical, similar, or functionally identical components.

DETAILED DESCRIPTION

Figure 1:
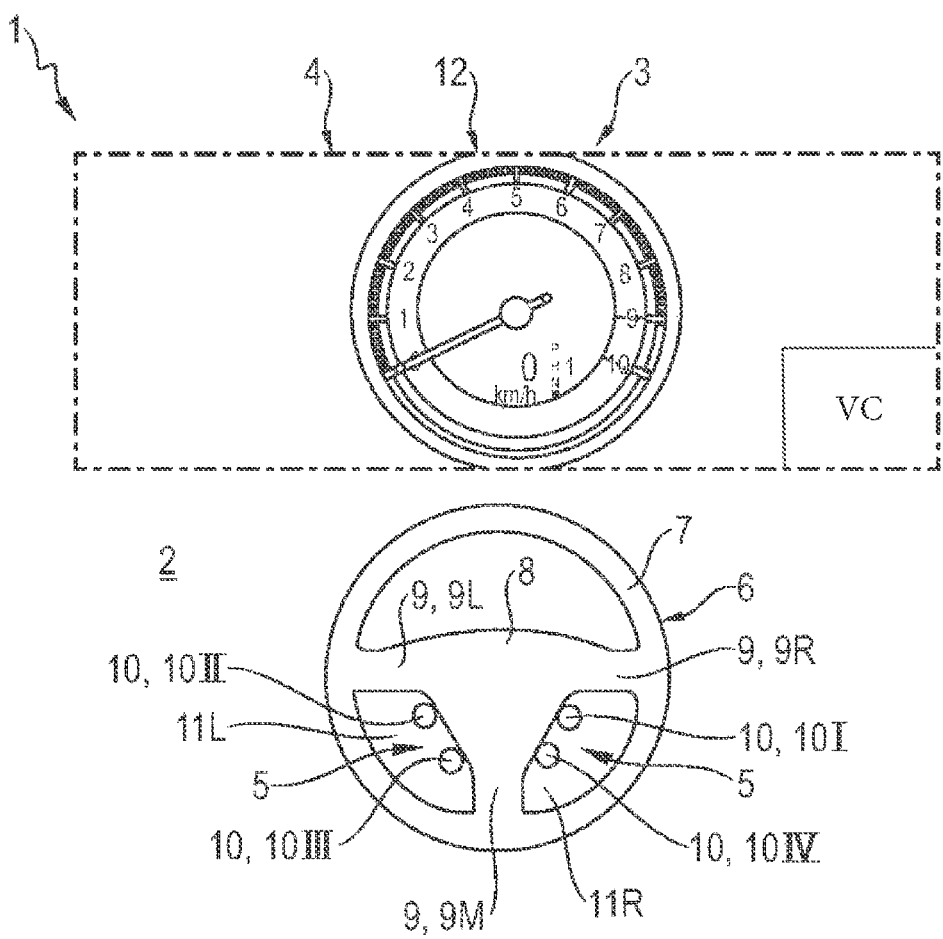
FIG. 1 is highly simplified schematic diagram of a display-and-control system having a combination instrument and a multi-function steering wheel.

FIG. 1 schematically illustrates a display-and-control system 1 of a vehicle 2. The vehicle 2 is not shown beyond the schematic illustration of FIG. 1. The display control system 1 has multiple display devices 3 that can be configured separately or combined in a combination instrument 4, as shown in FIG. 1. The display control system 1 also has multiple control devices 5 arranged on a multi-function steering wheel 6. The control devices 5 can be actuated by the driver and thus provide for driver-side interaction with the vehicle 2. The multi-functional steering wheel 6 comprises a rim 7, a hub 8, and at least three spokes 9 connecting the rim 7 to the hub 8. FIG. 1 shows exactly three spokes arranged in a T-shape to form a left spoke 9L, a right spoke 9R, and a middle spoke 9M that is arranged between and below the left and right spokes 9L, 9R when the multi-function steering wheel 6 is in the neutral position of FIG. 1. The neutral position of the steering wheel 6 is associated with a straight-line driving of the vehicle 2. The multi-functional steering wheel 6 may be mounted on a steering column so that the multi-functional steering wheel 6 is between the driver and the display devices 3. The display devices 3 may be incorporated into a dashboard or may be part of or comprise a display device or screen mounted to a dashboard. The control devices 5 may be connected to a battery or other power source on the vehicle, and further may be connected to the display devices 3 by one or more wiring harnesses passing along or through the steering column. The control devices 5 also may be connected wirelessly to the display devices 3 so that the control devices 5 control the display devices 3 as explained herein.

The control devices 5 comprise multiple control elements that are configured here as satellite buttons 10. The satellite buttons 10 are arranged on the multi-function steering wheel 6 in a left satellite space 11L or in a right satellite space 11R. The left satellite space 11L is bounded by the rim 7, the left spoke 9L and the middle spoke 9M. The right satellite space 11R is bounded by the rim 7, the right spoke 9R and the middle spoke 9M. The multi-function steering wheel 6 has a rotational axis that is perpendicular to the drawing plane. The satellite buttons 10 are arranged radially inside the rim 7 on an outside of the hub 8 or of the center spoke 9 that faces the rim 7. Exactly four satellite buttons 10 are shown in the embodiment of FIG. 1. However, other embodiments may have fewer or more than four satellite buttons 10. The four satellite buttons 10 of FIG. 1 form a first satellite button 10I, a second satellite button 10II, a third satellite button 10III, and a fourth satellite button 10IV. The first satellite button 10I and the fourth satellite button 10IV are arranged in the right satellite space 11R, while the second satellite button 10II and the third satellite button 10III are arranged in the left satellite space 11L.

The first satellite button 10I enables the driver to select one of multiple driving modes. Conceivable driving modes may include a normal mode, a comfort mode, a sport mode, and a racing mode.

The combination instrument 4 or the display devices 3 comprise a central main display device 12 to display at least one main control parameter of the vehicle 2. The combination instrument 4 or the display devices 3 may be mounted to or an integral part of a dashboard of the vehicle. In the example of FIG. 1, the main display device 12 shows the rotational speed and the velocity of the vehicle as the main control parameters. Optionally, the currently engaged gear can also be displayed, insofar as the vehicle 2 is equipped with a multi-speed transmission.

FIGS. 2 to 5 show embodiments of the combination instrument 4 or display devices 3 with at least one additional display device 13 disposed laterally to the left or right of the main display device 12. Each additional display device 13 is configured as interaction graphics in the form of a pop-up display and can be activated into at least one adjustment mode 14 that permits the additional display device 13 to display at least one additional control parameter that can be adjusted by the driver. The illustrated example has two such additional display devices 13 arranged respectively to the left and the right of the main display device 12, and therefore referred to respectively as the left additional display device 13L and the right additional display device 13R. The adjustable additional control parameters that are displayed with the aid of the respective additional display devices 13L, 13R can be adjusted by the driver in the respective adjustment mode 14 with the aid of the satellite buttons 10.

The control devices 5 and the display devices 13 are coordinated with one another wirelessly or via a wiring harness extending at least partly along the steering column. This connection is such that the respective additional display device 13 can be activated only in a predetermined driving mode, e.g. in the racing mode, but is deactivated and cannot be activated in all other driving modes, in particular in the normal mode and in the comfort mode. FIG. 1 shows that the two additional display devices 13 are not visible when in a deactivated state. The ability of the control devices 5 to control only certain display devices 13 and corresponding vehicle functions is enabled and carried out by circuitry, switches and other known communication means pursuant to controls of a vehicle controller VC, as described above.

The respective additional display device 13 is not activated automatically in the predetermined driving mode, but rather by the actuation of a further satellite button 10 that is different from the satellite button 10I. This actuation is carried out by the driver. The activated additional display device 13 displays at least two different additional control parameters, and these different additional control parameters can be adjusted individually with the aid of at least two different satellite buttons 10. In some embodiments, the first satellite button 10I can also be used to adjust an additional control parameter depending on the adjustment mode 14.

At least one satellite button 10 can be configured as a combination button that can be operated by pushing and rotating. Different control functions are associated with the pushing actuation, i.e. the pushing of the combination button and the rotating actuation, i.e. rotating the combined button. All four satellite buttons 10 are configured as such combination buttons. For example, the first satellite button 10I can enable the selection of the driving mode by pushing actuation and enables the adjustment of at least one additional control parameter by rotating actuation in the respective adjustment mode 14. It is also conceivable that the first satellite button 10I opens a drive mode selection menu by pushing actuation and then enables a selection of the particular drive mode by a rotating actuation. In the case of the additional satellite buttons 10, which are different from the first satellite button 10I, a pushing actuation in the predetermined driving mode enables the adjustment mode 14 of the respective additional display device, while a rotating actuation of the respective further satellite button 10 in the adjustment mode 14 enables the adjustment of at least one additional control parameter.

Two additional display devices 13 are provided and display different additional control parameters. These different additional control parameters can be adjusted individually by different satellite buttons 10, and a direct association is desired so that exactly one satellite button 10 is associated with each additional control parameter displayed. To support a simplified intuitive control, the additional control parameters displayed in the left additional display device 13L can be adjusted with the aid of the second satellite button 10II and the third satellite button 10III arranged in the left satellite space 11L. by. By contrast, the additional control parameters shown in the right additional display device 13R can be adjusted by the first satellite button 10I and the fourth satellite button 10IV arranged in the right satellite space 11R.

Figure 2:
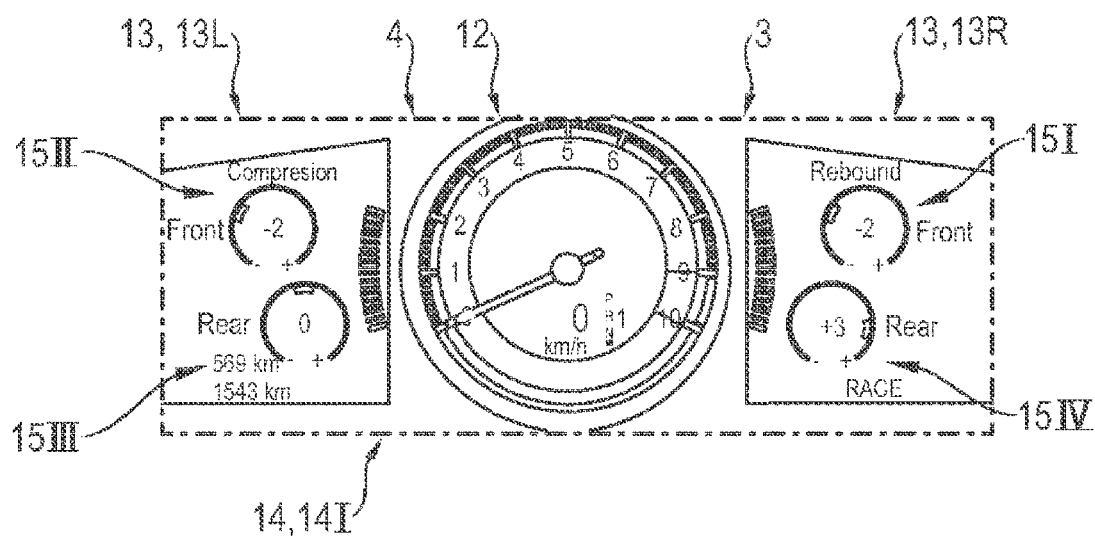
FIGS. 2 to 4 are views of the combination instrument in different adjustment modes.
Figure 3:
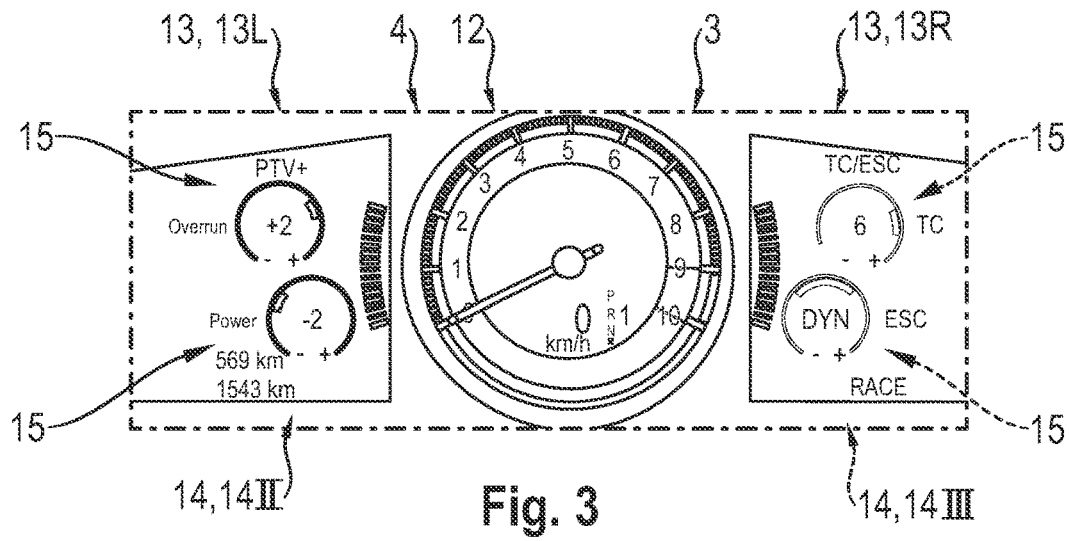
Figure 4:
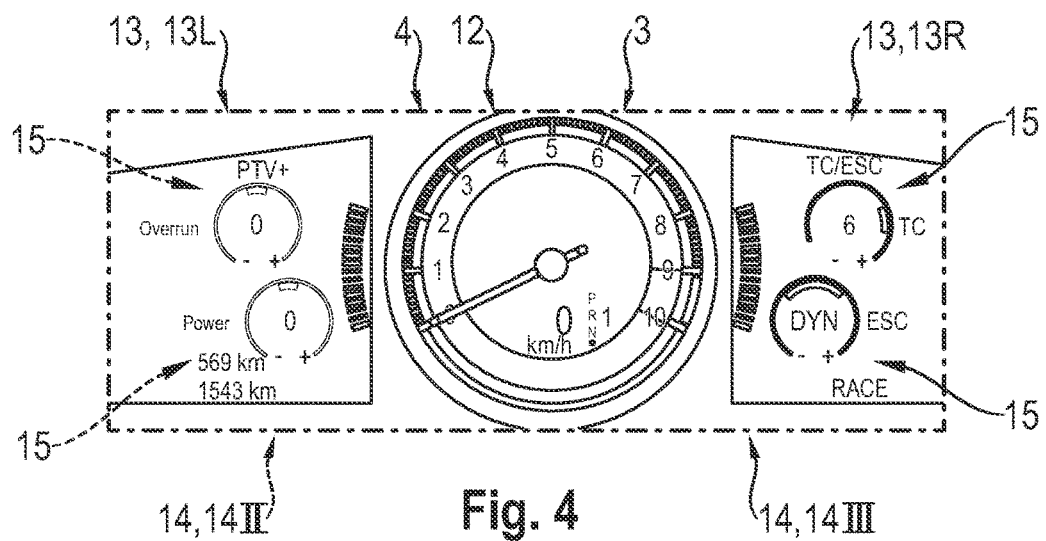

The additional display device 13 can be activated in different control modes or adjustment modes 14. Three different adjustment modes 14 are provided purely by way of example. FIG. 2 shows a first state in which both additional display devices 13 are activated in a first adjustment mode 14I. To induce this first state, the driver must, for example, actuate the second satellite button 10II in the predetermined driving mode. The second satellite button 10II activates both additional display devices 13 in the first adjustment mode 14I. FIG. 3 shows a second state in which only the left additional display device 13L is activated in a second adjustment mode 14II. To induce this second state, the driver must, for example, actuate the third satellite button 10III in the predetermined driving mode. Accordingly, the third satellite button 10III activates only the left additional display device 13L in the second adjustment mode 14II. FIG. 4 shows a third state in which only the right additional display device 13R is activated in a third adjustment mode 14III. To induce this third state, the driver must, for example, actuate the fourth satellite button 10IV in the predetermined driving mode. Accordingly, the fourth satellite button 10IV activates only the right additional display device 13R in the third adjustment mode 14III.

FIGS. 3 and 4 also show a further particularity here that can be implemented optionally. More particularly, the respective non-activated additional display device 13 is not completely deactivated in the second adjustment mode 14II and in the third adjustment mode 14III, but rather partially activated, such that the respective additional display device 13 is shown and visible to the driver in the respective other adjustment mode 14II and 14III but currently cannot be adjusted via the satellite buttons 10. Accordingly, in FIG. 3, it can be seen that, in the left additional display device 13L activated in the second adjustment mode 14II, the associated additional control parameters are shown in the foreground or lit up, while the additional control parameters of the partially activated right additional display device 13R are shown darkened or in the background. It is intuitively clear to the driver that, in the state of FIG. 3, he or she can only change the additional control parameters shown on the left. The opposite occurs in the state of FIG. 4. There, the control parameters of the activated right additional display device 13R are shown in the foreground or lit up, while the additional control parameters of the partially activated left additional display device 13L are shown in the background or darkened. Here, too, the vehicle driver is aware that he or she can currently only adjust the additional control parameters shown on the right.

FIG. 2 shows the state of the first adjustment mode 14I, where the left additional display device 13L displays an adjustable second additional control parameter 15II as well as an adjustable third additional control parameter 15III, while the right additional display device 13R displays an adjustable first additional control parameter 15I as well as an adjustable fourth additional control parameter 15IV. Satellite buttons 10 are associated with each of the four different additional control parameters 15 to achieve an intuitively simple adjustment of the additional control parameters 15 displayed in the additional display device 13. More particularly, in this first adjustment mode 14I, the first satellite button 10I functions to adjust the first additional operation 15I while the second satellite button 10II serves to adjust the second additional control parameter 15II, the third satellite button 10III functions to adjust the third additional control parameter 15III, and the fourth satellite button 10IV functions to adjust the fourth additional control parameter 15IV. Thus, the satellite buttons 10 arranged on the upper part of the multi-function steering wheel IV, i.e. the first and second satellite buttons 10I, 10II, are associated with the first and second additional control parameters 15I, 15II, while the satellite buttons 10 arranged further below, i.e. the third and fourth satellite buttons 10III, 10IV, are associated with the third and fourth additional control parameters 15III, 15IV. As can be seen, the first and second additional control parameters 15I, 15II are arranged respectively above the third and fourth additional control parameters 15III, 15IV in the respective additional display device 13. For example, the first adjustment mode 14I functions to adjust a spring-and-damper system of the vehicle 2. The first additional control parameter 15I can then represent the spring strength on a front axle, while the fourth additional control parameter 15IV represents the spring strength on the rear axle. The example obviously shows a dual-axis vehicle 2. The second additional control parameter 15II can then represent the damping strength at the front axle, while the third additional control parameter 15III represents the damping strength on the rear axle.

FIG. 3 shows that the additional control parameters 15 of the second adjustment mode 14II in the left additional adjustment device 13L are different from one another as well as being different from those of the first adjustment mode 14I. For example, the second adjustment mode 14II can adjust a torque vectoring system, which is indicated as "PTV+" in the left additional adjustment device 13L. Here, for example, the overrun can be adjusted with the second satellite button 10II and the power can be adjusted with the third satellite button 10III.

Figure 5:
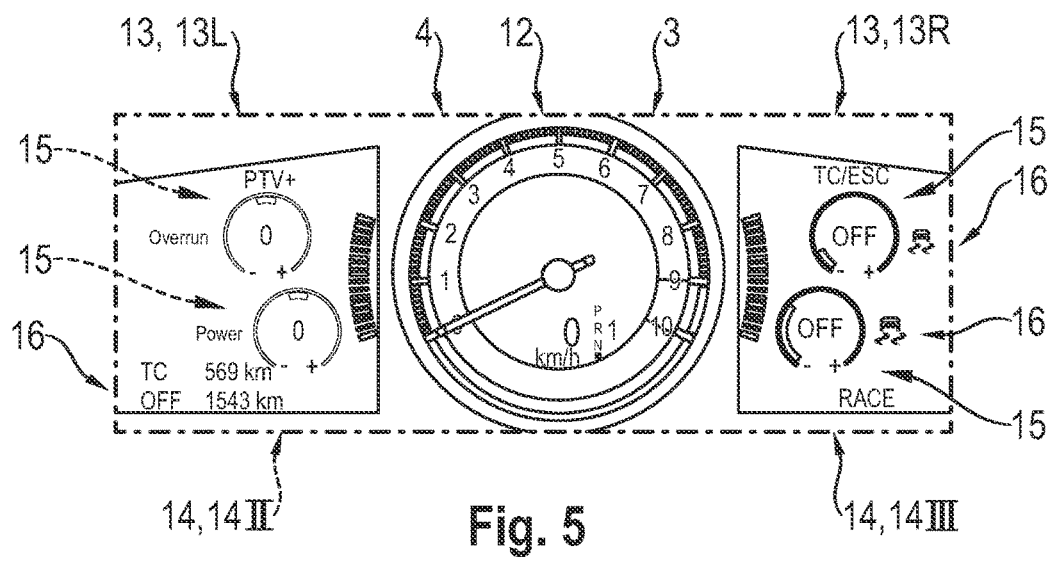
FIG. 5 is a view of the combination instrument with the adjustment mode of FIG. 4, but with other adjustments.

FIG. 4 shows that in the third adjustment mode 14III two additional control parameters 15 are displayed in the right additional display device 13R. These additional additional control parameters 15 are different from one another and different from those of the first adjustment mode 14I and the second adjustment mode 14II. For example, the third adjustment mode 14III functions to adjust a traction control "TC" as well as a vehicle stabilization system "ESC". For example, the engagement strength and/or sensitivity of the stabilization system or traction control can be adjusted. Moreover, this third adjustment mode enables the traction control and/or the stabilization system to be fully deactivated. FIG. 5 shows, by way of example, a fourth state in which traction control and the vehicle stabilization system are deactivated. The corresponding additional control parameters 15 show the value "OFF" and, if necessary, corresponding information as text. Additional alert icons 16 can be provided in both additional display devices 13 to indicate this state, which is not recommended for inexperienced drivers.

The two additional control parameters 15 shown above one another in the left additional display device 13L can be adjusted via the two satellite buttons 10 arranged in the left satellite space 11L. The upper additional control parameter 15 is associated with the second satellite button 10II, while the lower additional control parameter 15 is associated with the third satellite button 10III. The additional control parameters 15 shown on top of one another in the right additional display device 13R can be adjusted via the satellite buttons 10 arranged in the right satellite space 11R. The upper additional control parameter 15 is associated with the first satellite button 10I, while the lower additional control parameter 15 is associated with the fourth satellite button 10IV.

Furthermore, FIGS. 3, 4 and 5 show that the additional control parameters 15 of the non-active additional display device 13 are shown passively, so that they are visible to the driver of the vehicle. The respective additional display device 13 then is activated partially. In this partially activated state, the passively shown additional control parameters 15 are easily visible to the vehicle driver, but cannot be adjustable via the satellite buttons 10.

In simple terms, the control system 1 presented herein is configured such that the respective additional control parameter 15 shown in the respectively activated additional display device 13 depends on the adjustment mode 14 so that different additional control parameters 15 are displayed in the same additional display device 13 during different adjustment modes 14. In addition, the control system 1 can also be configured such that, in the respectively activated additional display device 13, different additional control parameters 15 can be adjusted with the same satellite button 10 during different adjustment modes 14.

The invention claimed is:

1. A display-and-control system (1) of a motor vehicle (2), comprising:
individual display devices (3) that include:
a central main display device (12) for displaying at least one main control parameter,
a left driver activatable lateral display device (13) disposed laterally left of the central main display device (12) and configured for displaying an upper left additional control parameter (15II) and a lower left additional control parameter (15III) below the upper left additional control parameter (15II),
a right driver activatable lateral display device (13R) disposed laterally right of the central main display device (12) for displaying an upper right additional control parameter (15I) and a lower right additional control parameter (15IV) below the upper right additional control parameter (15I), the left and right driver activatable lateral display devices (13L, 13R) being configured as interactive graphics for displaying the respective additional control parameters (15I, 15II, 15III, 15IV) when the at least one driver activatable lateral display device (13) has been driver activated; and
a multi-function steering wheel (6) having:
a rim (7),
a hub (8),
multiple spokes (9) connecting the hub (8) to the rim (7),
an upper left driver activatable control device (10II) arranged in a left satellite space (11L) bounded by two of the spokes (9) and the rim (7) on the multi-function steering wheel (6) and a lower left driver activatable control device (10III) arranged in the left satellite space (11L) below the upper left driver activatable control device (10II), the upper and lower left driver activable control devices (10II, 10III) being configured respectively to activate the upper left additional control parameter (15II) and the lower left additional control parameter (15III) of the left driver activatable lateral display device (13L) when a predetermined driving mode has been selected,
an upper right driver activatable control device (10I) arranged in a right satellite space (11R) bounded by two of the spokes (9) and the rim (7) on the multi-function steering wheel (6) and a lower right driver activatable control device (10IV) arranged in the right satellite space (11R) below the upper right driver activatable control device (10I), the upper and lower right driver actuatable control devices (10I, 10IV) being configured respectively to activate the upper right additional control parameter (15I) and the lower right additional control parameter (15IV) of the right driver activatable lateral display device (13R) when the predetermined driving mode has been selected,
wherein a spatial arrangement of the control devices (10I, 10II, 10III, 10IV) on the multifunction steering wheel (6) conforms to a spatial arrangement of the control parameters (15I, 15II, 15III, 15IV) on the left and right driver activatable lateral display devices (13L, 13R).

2. The system (1) of claim 1, wherein the control devices (5) comprise satellite buttons (10).

3. The system (1) of claim 1, wherein at least one of the control devices (10I, 10II, 10III, 10IV) is operative for selecting one of plural adjustment modes (14) and the at least one driver activatable lateral display device (13L, 13R)) is configured for displaying different control parameters in accordance with the adjustment mode (14) that has been selected by the driver activation and driver operation of the control devices (10I, 10II, 10III, 10IV).

4. The system (1) of claim 3, wherein the control devices (10I, 10II, 10III, 10IV) enable different control parameters (15) to be displayed in the lateral display device (13) in accordance with the adjustment mode (14) selected by the respective control devices (5).

5. The system (1) of claim 1, wherein the control devices (10I, 10II, 10III, 10IV) are configured as satellite buttons (10) that include a first satellite button (10I) configured to select a driving mode from multiple driving modes, and a respective additional display device (13) can be activated when the predetermined driving mode has been selected by the first satellite button (10I) and is deactivated and cannot be activated when the predetermined driving mode has not been selected by the first satellite button (10I), and wherein the respective additional display device (13) is activated in the predetermined driving mode only by actuating a further satellite button (10) that is different from the first satellite button (10I).

6. The system (1) of claim 1, wherein the respectively activated additional display device (13) displays at least two different additional control parameters (15) that are individually adjustable by actuating at least two different control elements.

7. A motor vehicle (2), comprising the display-and-control system (1) of claim 1.

8. A display and control system (1) of a motor vehicle (2) comprising:
individual display devices (3) that include: a central main display device (12) for displaying at least one main control parameter, a left driver activatable display device (13L) at a left side of the main display device (12) and a right driver activatable display device (13L) at a right side of the main display device (12), the left and right driver activatable lateral display devices (13L, 13R) being configured as interactive graphics for displaying different respective control parameters when driver activated;
a multi-function steering wheel (6) having a rim (7), a hub (8), multiple spokes (9) connecting the hub (8) to the rim (7) and first through fourth satellite buttons (10I, 10II, 10III, 10IV), the second satellite button (10II) being configured to activate both additional display devices (13L, 13R) in a first adjustment mode (14I), the third satellite button (10III) being configured to activate only the left additional display device (13L) in a second adjustment mode (14II), and the fourth satellite button (10IV) being configured to activate only the right additional display device (13R) in a third adjustment mode (14III).

9. A display and control system (1) of a motor vehicle (2), comprising:
individual display devices (3) that include: a central main display device (12) for displaying at least one main control parameter, a left driver activatable display device (13L) arranged left of the main display device (12) and a right driver activatable display device (13L) arranged right of the main display device (12), the left and right driver activatable lateral display devices (13L, 13R) being configured as interactive graphics for displaying different respective control parameters when driver activated;
a multi-function steering wheel (6) having a rim (7), a hub (8), multiple spokes (9) connecting the hub (8) to the rim (7) and first through fourth satellite buttons (10I, 10II, 10III, 10IV), the first and third satellite buttons (10I, 10III) being arranged in a left satellite space (11L) bounded by two spokes (9) and the rim (7) and the second and fourth satellite buttons (10II, 10IV) being arranged in a right satellite space (11R) bounded by two of the spokes (9) and the rim (7), one of the satellite buttons being configured to activate both additional display devices (13L, 13R) in a first adjustment mode (14I), in which an adjustable second additional control parameter (15II) and an adjustable third additional control parameter (15III) are displayed in the left additional display device (13L), while in the right additional display device (13R) an adjustable first additional control parameter (15I) and an adjustable fourth additional control parameter (15IV) are displayed, the first satellite button (10I) is arranged in the right satellite space (11R) and serves to adjust the first additional control parameter (15I), the second satellite button (10II) is arranged in the left satellite space (11L) and serves to adjust the second additional control parameter (15II), the third satellite button (10III) is arranged in the left satellite space (11L) and serves to adjust the third additional control parameter (15III), and the fourth satellite button (10IV) is arranged in the right satellite space (11R) and functions to adjust the fourth additional control parameter (15IV).

\* \* \* \* \*